United States Patent Office 3,491,392
Patented Jan. 27, 1970

3,491,392
BRIDGE BEARINGS
Roy A. Waller, Carshalton, Surrey, England, assignor to Kins Developments Limited
Filed Nov. 21, 1967, Ser. No. 684,747
Claims priority, application Great Britain, Dec. 7, 1966, 54,699/66
Int. Cl. E01d 19/04; F16c 33/22
U.S. Cl. 14—16       7 Claims

ABSTRACT OF THE DISCLOSURE

This invention concerns a deformable bearing for interposition between a structural element such as a beam or bridge deck and a support. The bearing is capable of accommodating angular and linear relative motion and comprising a deformable body encircled by sleeve-like flexible constraint means.

---

The present invention relates to bearings on which loads such as bridge decks or the like construction loads can be supported.

In the particular case of a bridge deck extending from one support or pier to another longitudinal expansion and contraction of the deck and rotation of the deck relative to the supports must be accommodated, rotation being due to transient and permanent loading of the deck and to settlement of one support relative to the other.

It has been proposed to hingedly anchor one end of a bridge deck to one support and to rest the other end on the other support by way of steel rollers. This is satisfactory up to a point but the rollers can become worn and develop a flat so that rotation is inhibited, and they cannot be lubricated satisfactorily after installation because of the very high pressure at the load bearing surfaces.

It has also been proposed to rest the free end of the deck on a parallelepiped rubber block which has metal inserts to strengthen it in shear. However, under severe rotation such a block can be in the natural state on that side remote from the hinge with all the weight concentrated at that side nearest the hinge. The upper surface can therefore become exposed to atmosphere with consequent detriment to the rubber and the rubber can become overloaded on the compressed side of the block.

According to the present invention there is provided a bridge or construction support bearing comprising a deformable body having flexible constraint means thereabout, the body under compression between a load and support being subjected to compression and being constrained by the flexible constraint means which is thereby placed under tension.

The body may comprise a rubber or elastomer core of cylindrical form having constraint means embedded in and/or extending about the axis of the body. Such constraint means may take the form of cords or strands extending about the body, a woven material or a continuous sleeve such as of steel.

In order that the invention may be well understood there will be described some embodiments thereof, given by way of example only, with reference to the accompanying drawing wherein.

Figure 1:
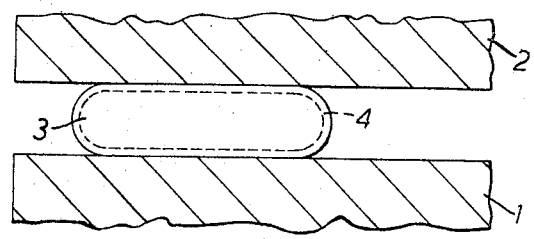
FIGURE 1 is a cross section of a bearing in accordance with the invention in position between a bridge deck and a supporting structure, the plane of the section being parallel with the centre line of the deck.
Figure 2:
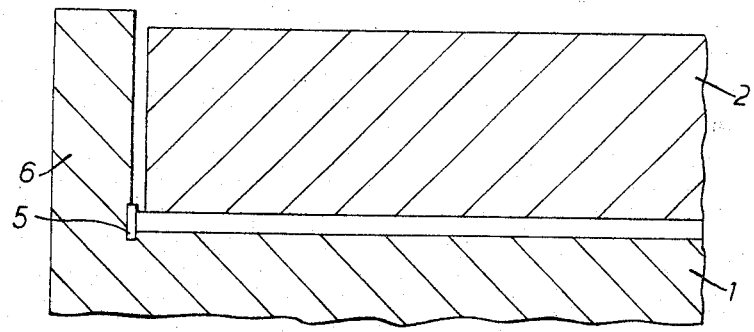
FIGURE 2 is a section in a plane extending across a bridge deck.

The bearing shown in FIGURES 1 and 2 extends across the width of the bridge, resting on a support 1 and bearing the bridge deck 2. This bearing comprises a deformable body 3 of rubber or rubber like material constrained by a peripheral constraint means 4 which will resist the bursting or spreading of the body. The constraint means may therefore be unidirectional taking the form of peripherally extending cable or cord, of high tensile strength. It may have additionally a degree of tensile strength axially of the bearing in which case it may take the form of a sleeve made up from continuous sheet material or woven or like material. The constraint means may be on the peripheral surface of the deformable body or be embedded in the body and materials from which it may be made include cellulose, plastic, such as nylon or terylene, or metal such as steel.

Instead of extending the full width of the bridge the bearing may be only of sufficient length for example to support a beam end. It is in such cases that some axially directed restraint may be particularly desirable.

To prevent the deformable body material from extruding axially under the radial load, the periphery of the body and constraint means at each end of the body may be extended to project axially beyond the central part of the body.

Figure 3:
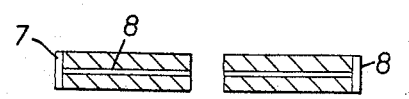
FIGURE 3 shows a further embodiment of the invention, being a section of a bearing in a plane including the axis of the bearing.

The extrusion of the body could alternatively be prevented by providing end faces 5 on inwardly facing support structure parts 6. Such faces could, for example, be of polytetrafluorethylene, and against them the bearing ends would abut and slide in the event of movement of the bearing on the support. In another arrangement shown in FIGURE 3 end caps 7 may be provided coupled by a tie rod 8. Such end plates could also be of polytetrafluorethylene. Then again each end zone within the constraint means may be plugged by a suitable plug provided that such a plug will function when the body distorts under radial load and when the distortion changes as the body moves due to axial movement of the bridge deck relative to the support.

A bearing may be fashioned in cylindrical form so that it becomes distorted under load or it may be fashioned to a shape approximating that which it will assume under load.

Instead of making the body from a distortable solid material, it may be a liquid in which case the constraint means comprise a liquid tight flexible container.

The bearing may have a degree of resilience which in the case of the liquid bearing may be provided by selection of a suitable material for the container.

To decrease the shear stiffness of the bearing in use a number of bearings may be stacked one upon another.

The advantages of the embodiments described are that the bearings allow for large angular movement of a bridge deck about a support as might occur on settlement of that support or on bending of a span while in the case of a solid body the surface strain is very small due to the constraint means. The possibility of ozone attack in the case of a rubber body is largely eliminated and the quality of the rubber used need not be high and indeed the rubber need not be fully cured.

I claim:
1. In a bridge structure having a bridge deck supported at at least one end by means of a bearing on a deck-support surface, the improved bearing which comprises a deformable body of a distortable solid material and having a sleeve-like flexible constraint means extending about the peripheral region of the body to resist bursting and spreading thereof, at least the principal portion of the weight of said deck end being supported by said body, which is compressed by the weight of the deck and constrained by the flexible constraint means, said constraint means being thereby placed under tension.

2. A structure according to claim 1 in which said body is of rubber.

3. A structure according to claim 1 in which constraint means are embedded in the peripheral region of the body.

4. A structure according to claim 1 in which the constraint means comprises at least one unidirectional reinforcement elements extending about the body.

5. A structure according to claim 1 in which the constraint means is formed from woven material.

6. A structure according to claim 1 in which the ends of the body lie axially within the ends of the constraint means.

7. A structure according to claim 1 in which the body is axially confined by end caps coupled together.

References Cited

UNITED STATES PATENTS

| 2,111,113 | 3/1938 | Fischer | 94—18 |
| 2,856,248 | 10/1958 | Hoyer | 308—243 |
| 2,714,011 | 7/1955 | Albee. | |
| 2,915,347 | 12/1959 | Hoyer | 308—243 |
| 3,325,842 | 6/1967 | Spencer | 14—16 |

FOREIGN PATENTS 883,436  11/1961  Great Britain.

JACOB L. NACKENOFF, Primary Examiner

U.S. Cl. X.R.

308—243